Patented Nov. 3, 1925.

1,560,446

UNITED STATES PATENT OFFICE.

JOSEPH H. WALLACE, OF STAMFORD, CONNECTICUT, ASSIGNOR TO PINE WASTE PRODUCTS, INC., OF NEW YORK, N. Y., A CORPORATION OF DELAWARE.

PULP PROCESS.

No Drawing.  Application filed August 25, 1920.  Serial No. 405,963.

*To all whom it may concern:*

Be it known that I, JOSEPH H. WALLACE, a citizen of the United States, and a resident of Stamford, county of Fairfield, and State of Connecticut, have invented certain new and useful Improvements in Pulp Processes, of which the following is a specification.

This invention relates to processes of treating pine wood; and it comprises a method of extracting resins, oleoresins, and terpenes of coniferous wood, and particularly of the wood of southern pine, wherein such wood is preliminarily extracted with a volatile solvent to recover some but not all of the resinous matter present, is thereafter disintegrated and reduced to a pulpy condition analogous to that of paper pulp by means of a hot alkaline solution, and the residue of the resinous matter is recovered from the alkaline solution; all as more fully hereinafter set forth and as claimed.

As is well known the wood of the southern pine is exceptionally rich in various resins, including rosin, and terpenes, including turpentine; and it is often used as a source of these materials. For this purpose the wood is finely comminuted and extracted with a hot volatile solvent of some kind; the extraction, in order to obtain a maximum yield, being usually continued as long as the solvent continues to remove substantial amounts of resinous matter. Benzol, benzine, gasoline, etc., have been used as the solvents. The extract is then distilled to recover the solvent, turpentine and pine oil and produce a resinous residue. The chief objection to this process is that the grade of the products obtained is low and the residual wood, because of its fine comminution is worthless for anything save fuel.

It is the object of the present invention to provide a method for economically recovering the resinous matter and terpenes in large yield while producing higher grade products. To this end, instead of trying to extract all the extractive matter with a volatile solvent as is the common practice, I take out only a portion of it in this manner, then digest and disintegrate the partially extracted wood with an alkaline solution such, for example, as a hot solution of caustic soda or of a combination of caustic soda with sodium carbonate, sulphide and sulphate in the manner used in making paper pulp and then recover resins, oleoresins and terpenes from the alkaline liquid. In other words, I extract the total resin and terpene content in two stages, with an intercalated alkaline digestion to break down the woody tissue. Since only a partial extraction is wanted in the first stage and fine comminution is therefore not important, I customarily merely chip the wood to about the size of pulp mill chips and perform the second stage of the operation (the alkaline digestion) in a pulp mill, thereby effecting an important economy in operation by producing cellulose as well as extractives.

By performing only a partial extraction with volatile solvents I secure a much higher grade extractive. The resinous and terpene bodies in pine are many and various, differing materially among each other in the ease with which they dissolve in, or are extracted by, the various solvents; and they suffer changes with age by oxidation and other chemical actions. As a rule these alterations decrease their solubility. In lightwood, stumps, etc., which are the most available material for the present purposes, frequently the contained resinous and terpene materials have been extensively altered. In a general way in any extraction with a solvent, the material comes out of the capillaries of the wood as a solution, and the thinner this solution, the quicker is the diffusion and the extraction. The unaltered turpentine and the resins of the nature of rosin form solutions with solvents which readily leave the wood whereas the thick and gummy altered products do not; at least not so readily. The wood also contains a certain amount of resinous and terpinic products which are naturally thick and gummy; and these are not readily extracted. Therefore by cutting down the time of extraction to, say, half an hour or so, I obtain a materially purer extractive; the difficultly soluble materials being, for the most part left behind. On distilling the extract I obtain a clean, good smelling turpentine and pine oil while the residue in the still is a high grade pale rosin.

The solvent used in this partial extraction is not a matter of indifference. I find it best to use a natural solvent; the fraction of the volatiles which distils over between the turpentine fraction and the pine oil fraction in distilling the extract being suitable for this purpose (see Clope No.

1,144,171 June 22, 1915). This material coming from the wood imports no foreign matter into the extracts as do petroleum hydrocarbons, and by its aid I secure a still higher grade of hard commercial rosin than by using other solvents.

are obtained in two stages and of two different grades. Those coming from the first extraction with volatile solvent are of high commercial grade; those from the latter operation are of lower quality but are never-